United States Patent
Maier et al.

(10) Patent No.: US 8,682,519 B2
(45) Date of Patent: Mar. 25, 2014

(54) METHOD FOR OPERATING A HYBRID DRIVE OF A VEHICLE

(75) Inventors: Ruben Maier, Herbrechtingen (DE); Harald Brunner, Ingolstadt (DE); Alexander Kruse, Ingolstadt (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 13/576,091

(22) PCT Filed: Jan. 15, 2011

(86) PCT No.: PCT/EP2011/000161
§ 371 (c)(1),
(2), (4) Date: Oct. 22, 2012

(87) PCT Pub. No.: WO2011/091957
PCT Pub. Date: Aug. 4, 2011

(65) Prior Publication Data
US 2013/0054063 A1   Feb. 28, 2013

(30) Foreign Application Priority Data

Jan. 30, 2010   (DE) .......................... 10 2010 006 305

(51) Int. Cl.
*B60W 20/00*   (2006.01)
*B62D 57/00*   (2006.01)
*B60W 10/08*   (2006.01)

(52) U.S. Cl.
USPC .............. 701/22; 701/55; 180/65.265; 477/3; 903/930

(58) Field of Classification Search
USPC ................ 701/55, 22; 180/65, 65.265; 477/3; 903/930
See application file for complete search history.

(56) References Cited

U.S. PATENT DOCUMENTS

| 6,570,265 | B1 * | 5/2003 | Shiraishi et al. | ............ 290/40 C |
| 2008/0011529 | A1 * | 1/2008 | Hoher et al. | ................. 180/65.2 |
| 2009/0062061 | A1 | 3/2009 | Silveri et al. | |
| 2009/0143188 | A1 | 6/2009 | Soliman et al. | |
| 2009/0321163 | A1 * | 12/2009 | Suzui | ....................... 180/65.265 |

FOREIGN PATENT DOCUMENTS

| DE | 198 14 402 | 10/1999 |
| DE | 102 61 278 | 7/2004 |
| DE | 10 2006 006 107 | 8/2007 |
| DE | 10 2006 044 427 | 4/2008 |

(Continued)

OTHER PUBLICATIONS

English translation from EPO of DE102006044427 A1.*

(Continued)

*Primary Examiner* — Fadey Jabr
*Assistant Examiner* — Yazan A Soofi
(74) *Attorney, Agent, or Firm* — Staas & Halsey LLP

(57) ABSTRACT

A method operates a hybrid drive of a motor vehicle, which hybrid drive has an internal combustion engine and a first electric machine. The method generates, in response to a predefined setpoint torque value, a composite torque which drives the motor vehicle. In a transient operating mode which occurs during a change of the predefined setpoint torque value by a value, the composite torque is generated by summing a drive torque which is generated by the internal combustion engine and a drive torque which is generated by the first electric machine. At least one second electric machine is provided which is switched on during the transient operating mode in order to generate the composite torque of the internal combustion engine and of the first electric machine.

16 Claims, 3 Drawing Sheets

(56) References Cited

FOREIGN PATENT DOCUMENTS

| DE | 10 2006 047 609 | | 4/2008 |
|---|---|---|---|
| DE | 102006044427 | * | 4/2008 |
| DE | 10 2007 023 164 | | 11/2008 |
| DE | 102007023164 | * | 11/2008 |
| DE | 10 2007 050 113 | | 4/2009 |
| DE | 10 2008 000 577 | | 9/2009 |
| DE | 10 2008 041 897 | | 3/2010 |
| DE | 10 2008 053 505 | | 4/2010 |

OTHER PUBLICATIONS

English translation from EPO of DE102007023164 A1.*
German Office Action for German Priority Patent Application No. 10 2010 006 305.3, issued Jul. 23, 2012.
International Search Report for PCT/EP2011/000161, mailed on Mar. 9, 2011.
German Office Action for German Priority Patent Application 10 2010 006 305.3, issued on Aug. 11, 2010.

* cited by examiner

METHOD FOR OPERATING A HYBRID DRIVE OF A VEHICLE

CROSS REFERENCE TO RELATED APPLICATIONS

This application is based on and hereby claims priority to International Application No. PCT/EP2011/000161 filed on Jan. 15, 2011 and German Application No. 10 2010 006 305.3 filed on Jan. 30, 2010, the contents of which are hereby incorporated by reference.

BACKGROUND

The invention relates to a method for operating a hybrid drive of a motor vehicle.

A hybrid drive of a motor vehicle is usually embodied as a parallel hybrid or power-split hybrid. The drive train of the motor vehicle usually has for this purpose an internal combustion engine and an electric machine. In a power-split hybrid, on the one hand the electric machine assists the internal combustion engine in driving the motor vehicle, and on the other hand, in a recuperation mode, the electric machine supplies an electric store and/or an electrical on-board power system of the motor vehicle with the necessary electrical energy.

In addition, in a hybrid drive the electric machine can be used to compensate a delayed response of the internal combustion engine in a transient mode by adjustment to a predefined torque value, i.e. the electric machine assists the internal combustion engine to reach a predefined torque value of the hybrid drive more quickly. Delayed response of the internal combustion engine occurs in turbo-charged diesel engines and, in particular, in turbo-charged petrol engines when so-called turbo lag occurs. In spark ignition engines, the delayed response and therefore a transient operating mode occurs as a result of the limited dynamics of the air path for the intake air. Spark ignition engines and diesel engines usually have an electronic throttle valve for regulating the air mass flow. The accelerator pedal is mechanically decoupled from this electronic throttle valve. The lag time of the intake manifold, the delayed charge air buildup of the turbocharger and dynamic charging effects in the air path do not permit highly dynamic setting of a predefined air mass flow and of the internal combustion engine torque which is generated as a result. Intervening in the ignition angle path allows the response behavior of the internal combustion engine to be improved, but in the process the efficiency of the internal combustion engine is degraded, as a result of which the fuel consumption and the exhaust gas emissions are increased.

The torque actuation of an electric machine has a much larger dynamic compared to internal combustion engines. For example, DE 10 2006 044 427 A1 describes a method for operating a hybrid drive of a motor vehicle in which a transient operating mode of the internal combustion engine is compensated by an electric machine. In this method, a dynamic drive train can be disadvantageously ensured only until the electric machine comes up against its system limits.

SUMMARY

One possible object is to make available a method by which a hybrid drive is further improved, in particular in the transient operating mode of the internal combustion engine, and in particular the dynamics of the hybrid drive are increased. Furthermore, an object of the invention is to make available a motor vehicle which can be operated with this method.

The inventors propose a method in which at least one second electric machine is provided which generates a drive torque which, in a transient operating mode, is summed together with the drive torques of the internal combustion engine and the first electric machine to form the composite torque. In this way, the dynamics of the drive train can be obtained even if one of the two electric machines cannot compensate the transient operating mode of the internal combustion engine alone, for example because a system limit of the electric machine is reached.

In particular, the internal combustion engine and the first electric machine can form an axle drive, particularly an axle drive for a front axle, of the motor vehicle, in which axle drive the internal combustion engine and the first electric machine provide drive via a common transmission. The second electric machine can preferably form an axle drive, in particular an axle drive for a rear axle, independently of the first electric machine and of the internal combustion engine. The first and the second electric machines can therefore contribute, independently of one another, a torque to driving the vehicle, as a result of which a particularly efficient and dynamic all wheel drive of the motor vehicle can be implemented.

In one specific embodiment the first or second electric machine can be switched on at the start of the transient interval with a delay after the activation of the first or second electric machine, or the drive torque thereof rises with the delay with respect to the drive torque generated by the first or second electric machine. Alternatively, the first and the second electric machine can be switched on simultaneously at the start of the transient interval. In addition, the first or second electric machine can be deactivated at the end of the transient interval in advance of the first or second electric machine by a time offset, or the drive torque thereof can drop delayed by the time offset with respect to the drive torque generated by the first or second electric machine. The delayed activation or deactivation of the first or second electric machine can occur, for example, as a function of the efficiency.

In particular, the first and/or second electric machine is operated or deactivated before and/or after the transient interval in the overrun mode or recuperation mode, and/or the composite torque generated by the hybrid drive is formed before and/or after the transient interval by the drive torque of the internal combustion engine and/or of the first electric machine and/or of the second electric machine. As a result, before and/or after the transient interval the first and/or second electric machine can be used in an assisting fashion or exclusively for propelling the motor vehicle. As a result of the overrun mode or the recuperation mode of the electric machines, the amount of energy consumed during the transient operating mode of the internal combustion engine can be fed again to an energy store subject to efficiency. Furthermore, the electrical energy acquired in the overrun mode or recuperation mode can be used to supply the on-board power system subject to efficiency.

A control device for activating the internal combustion engine, the first electric machine and the second electric machine can preferably calculate in each case associated first to third setpoint torques, to be precise in particular on the basis of an operating state of the internal combustion engine, of the first electric machine and/or of the second electric machine. Taking into account the operating states of the individual assemblies in the calculation of the setpoint torques allows the efficiency of the hybrid drive to be increased. In addition, the efficiency levels of the electric machines, the temperature of the power electronics, the temperature of the battery and/or the charge state of the battery can also be taken into account in the calculation of the setpoint torques.

In one specific embodiment the control device can calculate the first to third setpoint torques as a function of at least one parameter, in particular an accelerator pedal travel, determined by a sensor. As a result, a user-side torque request, for example during an overtaking maneuver, can directly also be included in the calculation of the setpoint torque by a solution which is simple in terms of control technology.

When a cruise control system, in particular an adaptive cruise control system is used, the control device can calculate the first to third setpoint torques as a function of a parameter obtained by the cruise control system. In this context, the parameter can be, for example, a distance from a vehicle traveling ahead which is obtained by a radar sensor.

In particular, the setpoint torques can be limited by a limiting value which is defined or calculated by the control device. In this way, damage to the drive assemblies, in particular the electric machines, due to overloading, can be prevented easily in terms of control technology.

In one specific embodiment, the limiting value can be calculated by the control device as a function of at least one parameter determined by a sensor, the parameter being, in particular a temperature of an energy store, a charge state of an energy store or a temperature of power electronics. As a result, on the one hand the presence of a sufficient quantity of energy in an energy store, for example a battery, can be ensured. On the other hand, overheating of the energy store, or of the power electronics of the electric machines, can be prevented. Particularly the power electronics of the electric machines may be susceptible to damage by overheating owing to the strong current flows. Such damage is prevented by taking into account the temperature of the power electronics in the calculation of a limiting value of the setpoint torque.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
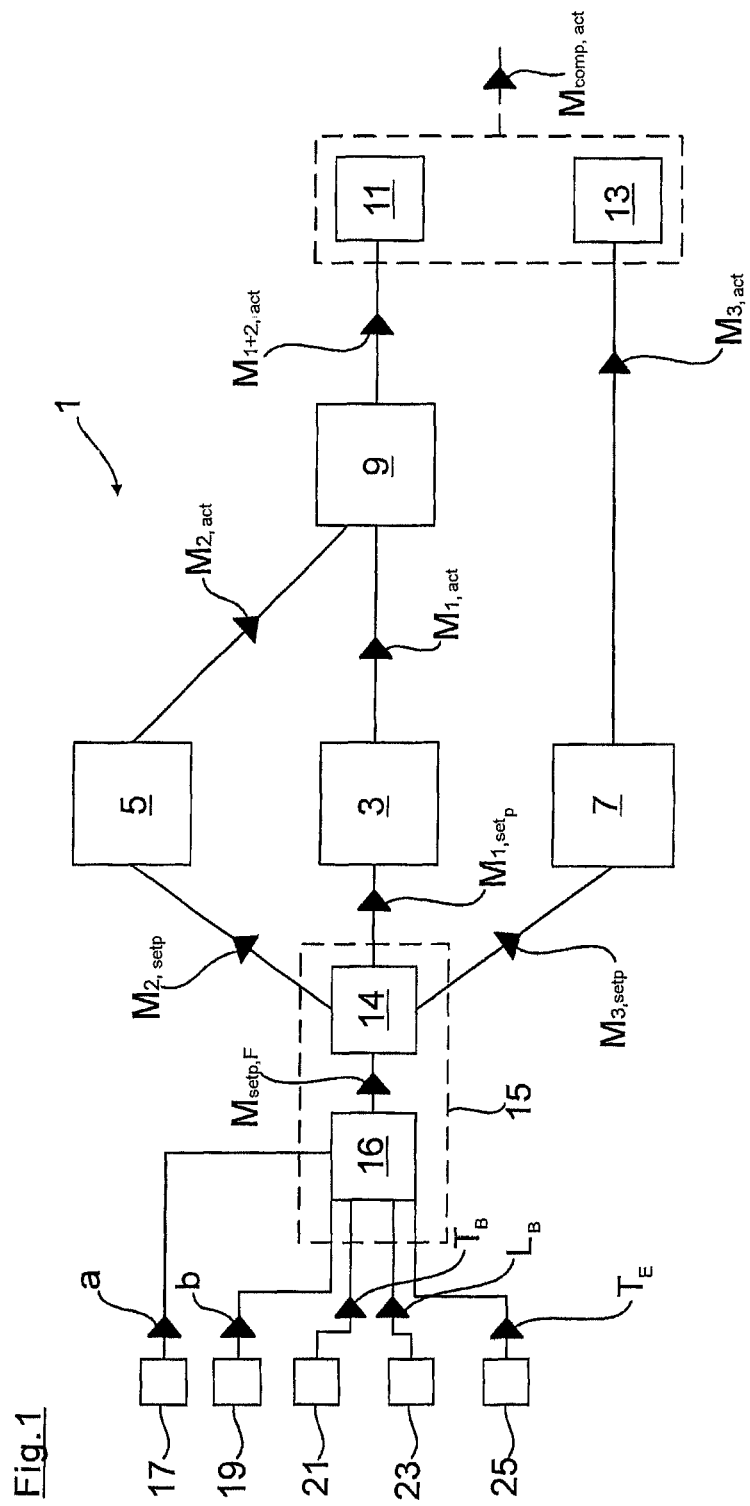
FIG. 1 is a basic illustration of a hybrid drive of a motor vehicle.

Reference will now be made in detail to the preferred embodiments of the present invention, examples of which are illustrated in the accompanying drawings, wherein like reference numerals refer to like elements throughout.

FIG. 1 is a schematic basic illustration of a hybrid drive 1 of a motor vehicle. As is apparent from FIG. 1, the hybrid drive 1 has an internal combustion engine 3, a first electric machine 5 and a second electric machine 7.

The internal combustion engine 3 and the first electric machine 5 each transmit an actual torque $M_{1,act}$, $M_{2,act}$ to a transmission 9 by which a drive torque $M_{1+2,act}$ for a front axle 11 of the vehicle is generated. The second electric machine 7 transmits a drive torque $M_{3,act}$ directly to a rear axle 13. A composite torque $M_{Comp,act}$ which drives the motor vehicle is obtained by summing the drive torque $M_{1+2,act}$ and the drive torque $M_{3,act}$.

As is apparent from FIG. 1, the internal combustion engine 3 and the first and second electric machines 5, 7 are connected to an evaluation device 14 of a control device 15 in terms of control technology. In addition, it is apparent from FIG. 1 that a setpoint torque calculation unit 16 of the control device 15 is connected in terms of signal technology to a sensor 17 for an accelerator pedal travel a, a cruise control system with a distance sensor 19, a sensor 21 for a battery temperature $T_B$, a sensor 23 for a battery charge state $L_B$ and a sensor 25 for a temperature $T_E$ of the power electronics.

According to FIG. 1, the setpoint torque calculation unit 14 calculates a setpoint torque $M_{set,F}$ of the hybrid drive 1 on the basis of the accelerator pedal travel a obtained by the sensor 17 or a parameter b transmitted by the cruise control system 19. When a cruise control system 19 with adaptive cruise control is used, the transmitted parameter b may be, for example, a distance from a vehicle traveling ahead which is obtained by a radar sensor.

As is apparent from FIG. 1, the evaluation device 14 generates first to third setpoint torques $M_{1,Setp}$, $M_{2,Setp}$, $M_{3,Setp}$, on the basis of the setpoint torque $M_{Setp,F}$ as a function of the operating states of the internal combustion engine 3 and of the electric machines 5, 7. The first to third setpoint torques $M_{1,Setp}$, $M_{2,Setp}$, $M_{3,Setp}$ are each transmitted as control signals to a control device of the internal combustion engine 3 and to the control devices of the electric machines 5, 7. The internal combustion engine 3 and the electric machines 5, 7 then generate the actual torques $M_{1,act}$, $M_{2,act}$, $M_{3,act}$ as a function of the setpoint torques $M_{1,setp}$, $M_{2,Setp}$, $M_{3,Setp}$.

Figure 2:
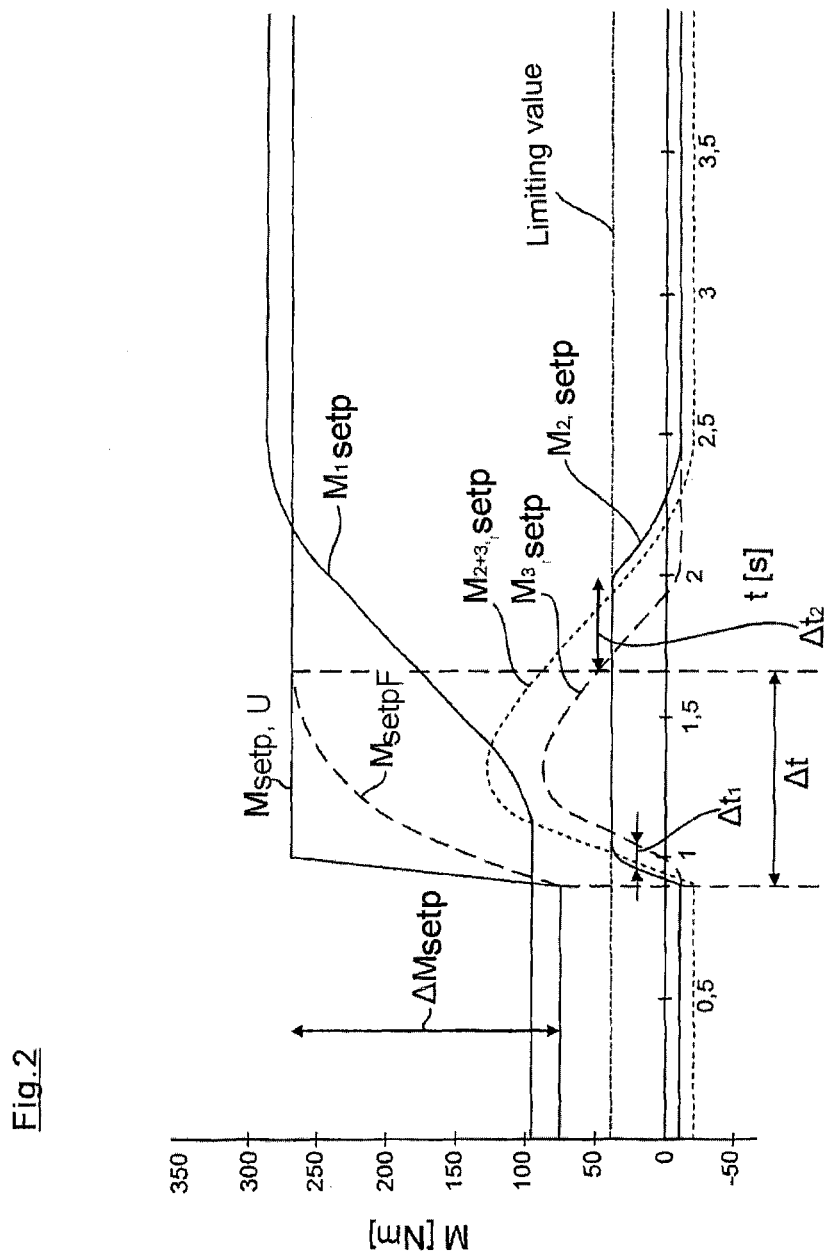
FIGS. 2 and 3 each show a time/torque diagram of the setpoint torques calculated by a control device for an internal combustion engine and two electric machines.

FIG. 2 shows an exemplary time profile of the setpoint torques $M_{1,Setp}$, $M_{2,Setp}$, $M_{3,Setp}$ which are calculated by the control device 15 and passed on to the internal combustion engine 3 and the electric machines 5, 7. In addition, the profile of an unfiltered setpoint torque $M_{Setp,U}$ and of a filtered setpoint torque $M_{Setp,F}$ for the hybrid drive 1 is illustrated in FIG. 2.

The unfiltered setpoint torque $M_{Setp,U}$ corresponds to the torque which was requested on the user side by actuation of an accelerator pedal. Alternatively the unfiltered setpoint torque $M_{Setp,U}$ can correspond to a torque requested by the cruise control system 19. The unfiltered setpoint torque $M_{Setp,U}$ is converted into the filtered setpoint torque $M_{Setp,F}$ by the setpoint torque calculation unit 16 of the control device 15 by taking into account the maximum conversion capability of the hybrid drive 1. The time profile of the filtered setpoint torque $M_{Setp,F}$ of the hybrid drive 1 corresponds to the time profile of the summed setpoint torques $M_{1,Setp}$, $M_{2,Setp}$, $M_{3,Setp}$, of the internal combustion engine 3 and of the two electric machines 5, 7. Summing the setpoint torques $M_{2,Setp}$, $M_{3,Setp}$ of the two electric machines 5, 7 results in a setpoint torque $M_{2+3,Setp}$, the time profile of which is also illustrated in FIG. 2.

Figure 3:
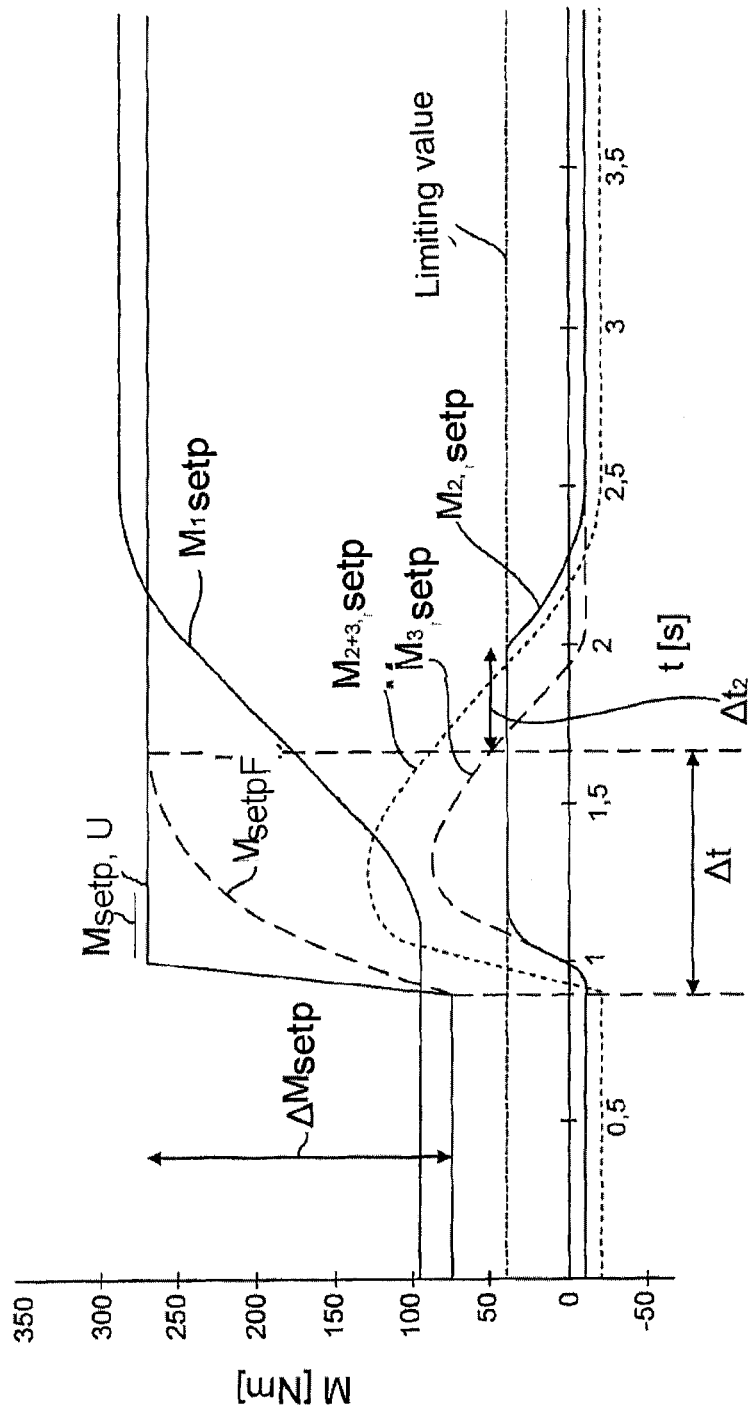

In the diagrams in FIGS. 2 and 3, the time profiles of the actual drive torques $M_{1,act}$, $M_{2,act}$, $M_{2+3,act}$ and $M_{Comp,act}$ are not illustrated for reasons of clarity. The time profile of these actual drive torques follows the time profiles of the corresponding setpoint drive torques $M_{1,Setp}$, $M_{2,Setp}$, $M_{3,Setp}$, $M_{2+3,Setp}$ and $M_{Setp,F}$ with a slight delay in their time profile.

According to FIG. 2, when the unfiltered setpoint torque $U_{Setp,U}$ is increased by a value $\Delta M_{Setp}$, the filtered setpoint torque $M_{Setp,F}$ rises in a transient interval $\Delta t$ up to a corresponding steady-state value. In order to reach the steady-state value, the setpoint torques $M_{2,Setp}$, $M_{3,Setp}$ of the two electric machines 5, 7 assist setpoint torque $M_{1,Setp}$, of the internal combustion engine 3. The division into the setpoint torques $M_{2,Setp}$ and $M_{3,Setp}$ is done by considering the efficiency and limiting value of the two electric machines 5, 7.

From FIG. 2 it is apparent that the setpoint torque $M_{2,Setp}$ of the first electric machine 5 has a limiting value GW which constitutes a system limit of the first electric machine 5. The limiting value GW is calculated by the control device 15 on the basis of the signals of the sensor 21 for the battery temperature $T_B$, of the sensor 23 for the battery charge state $L_B$ and of the sensor 25 for the temperature $T_E$ of the power electronics.

As is also apparent from FIG. 2, the setpoint torque $M_{3,Setp}$ of the second electric machine 7 rises at the start of the transient interval $\Delta t$ with a time offset $\Delta t_1$ with respect to the setpoint torque $M_{2,Setp}$ of the first electric machine 5. At the end of the transient interval $\Delta t$, the setpoint torque $M_{3,Setp}$ of the second electric machine 7 drops with a time offset $\Delta t_2$ with respect to the setpoint torque $M_{2,Setp}$ of the first electric machine 5 in an advancing fashion.

Before and after the transient interval $\Delta t$, the two electric machines 5, 7 are operated in the overrun mode. As a result of friction and magnetic opposing forces, the setpoint torques $M_{2,Setp}$, $M_{3,Setp}$, are negative in this region. Alternatively, the two electric machines 5, 7 can also be used actively for recuperation before and after the transient interval $\Delta t$.

As already mentioned above, after the expiry of the time offset $\Delta t_1$ according to the diagram in FIG. 2, the second electric machine 7 is switched on with a delay. The switching on of the second electric machine 7 occurs here at a time at which the control device 15 detects that the first electric machine 5 will come up against its system limit. By switching on the second electric machine 5 it is therefore ensured that the filtered overall setpoint torque $M_{setp}F$ is reached by all three machines 3, 5, 7.

The operating strategy illustrated in the diagram in FIG. 3 corresponds substantially to that in FIG. 2. However, in contrast to FIG. 2 the switching on of the second electric machine 7 does not occur delayed by time offset $\Delta t_1$ but rather simultaneously with the first electric machine 5, in order to avoid the first electric machine 5 coming up against its system limit.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. A method for operating a hybrid drive of a motor vehicle, which hybrid drive has an internal combustion engine and first and second electric machines, comprising:
   generating a composite torque which drives the motor vehicle in a transient operating mode which occurs during a change of a setpoint torque by at least a predefined value, the composite torque in the transient operating mode being generated by summing at least a drive torque which is generated by the internal combustion engine, a drive torque which is generated by the first electric machine and a drive torque which is generated by the second electric machine, such that the second electric machine is switched on during the transient operating mode in order to help generate the composite torque, the second electric machine being controlled by a process comprising:
      at a start of the transient operating mode:
         activating the second electric machine with a delay after activating the first electric machine, wherein the second electric machine is activated at a time when it is detected the first electric machine approaches a system limit; and
      at an end of the transient operating mode:
         deactivating the second electric machine in advance of deactivating the first electric machine, with a time offset between deactivation of the second and first electric machines, or
         decreasing the drive torque generated by the second electric machine in advance of decreasing the drive torque generated by the first electric machine, with a time offset between decreasing the drive torques respectively generated by the second and first electric machines.

2. The method according to claim 1, wherein the drive torque generated by the second electric machine reduces a transient time interval during which the transient operating mode occurs, the transient time interval being reduced with respect to a time interval that would be required if the composite torque was generated without the drive torque of the second electric machine.

3. The method according to claim 1, wherein
   the internal combustion engine and the first electric machine drive a front axle of the motor vehicle, and
   the internal combustion engine and the first electric machine drive the front axle via a common transmission.

4. The method according to claim 3, wherein
   the second electric machine is independent and decoupled from the first electric machine and the internal combustion engine, and
   the second electric machine drives a rear axle of the motor vehicle.

5. The method according to claim 1, wherein
   at least one of the first and second electric machines is deactivated and switched to a recuperation mode before and/or after the transient operating mode,
   during the recuperation mode, the composite torque is generated without the at least one of the first and second electric machines, and
   during the recuperation mode, the at least one of the first and second electric machines operates as a generator.

6. The method according to claim 1, wherein
   a control device actuates the internal combustion engine, the first electric machine and the second electric machine, and
   the control device calculates first to third setpoint sub-torques based respectively on operating states of the internal combustion engine, the first electric machine and the second electric machine.

7. The method according to claim 6, wherein the control device calculates the first to third setpoint sub-torques as a function of an accelerator pedal travel, as determined by a sensor.

8. The method according to claim 6, wherein the control device calculates the first to third setpoint sub-torques as a function of a parameter obtained from an adaptive cruise control system.

9. The method according to claim 6, wherein each of the first to third setpoint sub-torques is limited by a limiting value which is defined or calculated by the control device.

10. The method according to claim 9, wherein the limiting value is calculated by the control device as a function of at least one parameter selected from the group consisting of a temperature of an energy store, a charge state of the energy store and a temperature of power electronics.

11. The method according to claim 1, wherein
the second electric machine is independent and decoupled from the first electric machine and the internal combustion engine, and
the second electric machine drives a rear axle of the motor vehicle.

12. The method according to claim 1, wherein
the first and second electric machines are deactivated and switched to a recuperation mode before and/or after the transient operating mode,
during the recuperation mode, the composite torque is generated without the first and second electric machines, and
during the recuperation mode, the first and second electric machines operate as generators.

13. The method according to claim 1, wherein
at least one of the first and second electric machines is operated in an overrun mode before and/or after the transient operating mode,
during the overrun mode, the composite torque is generated without the internal combustion engine.

14. The method according to claim 1, wherein the system limit is determined based on at least one of a measured battery temperature, battery charge state, and power electronics temperature.

15. A method for operating a hybrid drive of a motor vehicle, which hybrid drive has an internal combustion engine and first and second electric machines, comprising:
generating a composite torque which drives the motor vehicle in a transient operating mode which occurs during a change of a setpoint torque by at least a predefined value, the composite torque in the transient operating mode being generated by summing at least a drive torque which is generated by the internal combustion engine, a drive torque which is generated by the first electric machine and a drive torque which is generated by the second electric machine, such that the second electric machine is switched on during the transient operating mode in order to help generate the composite torque, the second electric machine being controlled by a process comprising:
at a start of the transient operating mode:
activating the second electric machine with a delay after activating the first electric machine, or
increasing the drive torque generated by the second electric machine with a delay with respect to the drive torque generated by the first electric machine; and
at an end of the transient operating mode:
deactivating the second electric machine in advance of deactivating the first electric machine, with a time offset between deactivation of the second and first electric machines, or
decreasing the drive torque generated by the second electric machine in advance of decreasing the drive torque generated by the first electric machine, with a time offset between decreasing the drive torques respectively generated by the second and first electric machines,
wherein during the time offset, the drive torque of the first electric machine is maintained at a limiting value corresponding to a system limit of the first electric machine.

16. A method for operating a hybrid drive of a motor vehicle, which hybrid drive has an internal combustion engine and first and second electric machines, comprising:
generating a composite torque which drives the motor vehicle in a transient operating mode which occurs during a change of a setpoint torque by at least a predefined value, the composite torque in the transient operating mode being generated by summing at least a drive torque which is generated by the internal combustion engine, a drive torque which is generated by the first electric machine and a drive torque which is generated by the second electric machine, such that the second electric machine is switched on during the transient operating mode in order to help generate the composite torque, the second electric machine being controlled by a process comprising:
at a start of the transient operating mode:
activating the second electric machine with a delay after activating the first electric machine, or
increasing the drive torque generated by the second electric machine with a delay with respect to the drive torque generated by the first electric machine; and
at an end of the transient operating mode:
deactivating the second electric machine in advance of deactivating the first electric machine, with a time offset between deactivation of the second and first electric machines, or
decreasing the drive torque generated by the second electric machine in advance of decreasing the drive torque generated by the first electric machine, with a time offset between decreasing the drive torques respectively generated by the second and first electric machines,
wherein at the start of the transient operating mode:
the second electric machine is activated with a delay after activating the first electric machine or the drive torque generated by the second electric machine is increased with a delay with respect to the drive torque generated by the first electric machine, at a time when it is detected the first electric machine approaches a system limit.

* * * * *